United States Patent [19]

Forestier

[11] 4,456,791
[45] Jun. 26, 1984

[54] OFF-HOOK DETECTOR WITH REDUCED SENSITIVITY TO COMMON MODE

[75] Inventor: Alain Forestier, Lannion, France

[73] Assignee: Telecommunications Radioelectriques et Telephoniques T.R.T., Paris, France

[21] Appl. No.: 356,604

[22] Filed: Mar. 9, 1982

[30] Foreign Application Priority Data

Mar. 11, 1981 [FR] France .................. 81 04850

[51] Int. Cl.³ .......................................... H04M 3/22
[52] U.S. Cl. ................................................ 179/18 FA
[58] Field of Search ...................... 179/18 FA, 16 AA

[56] References Cited

U.S. PATENT DOCUMENTS

| | | | |
|---|---|---|---|
| 3,772,477 | 11/1973 | Richards | 179/16 EA |
| 4,087,646 | 5/1978 | Brolin et al. | 179/18 FA |
| 4,158,109 | 6/1979 | Dijkmans et al. | 179/18 FA |
| 4,178,485 | 12/1979 | Cowpland et al. | 179/18 FA |
| 4,297,531 | 10/1981 | Dalhof et al. | 179/16 AA |

FOREIGN PATENT DOCUMENTS 2021358 11/1979 United Kingdom .......... 179/18 FA

Primary Examiner—Thomas W. Brown
Attorney, Agent, or Firm—Thomas A. Briody; William J. Streeter

[57] ABSTRACT

An off-hook detector for use in subscriber line interface circuits to indicate status of the subscriber line, or loop, exhibits reduced sensitivity to common mode or longitudinal currents. A central signal from the exchange switches the transmission bridge for the subscriber line from a balanced to an unbalanced condition. In the balanced condition a difference detector indicates loop status. In the unbalanced condition, a comparator compares the voltage on one side of the transmission bridge to a reference voltage to indicate loop status.

1 Claim, 1 Drawing Figure

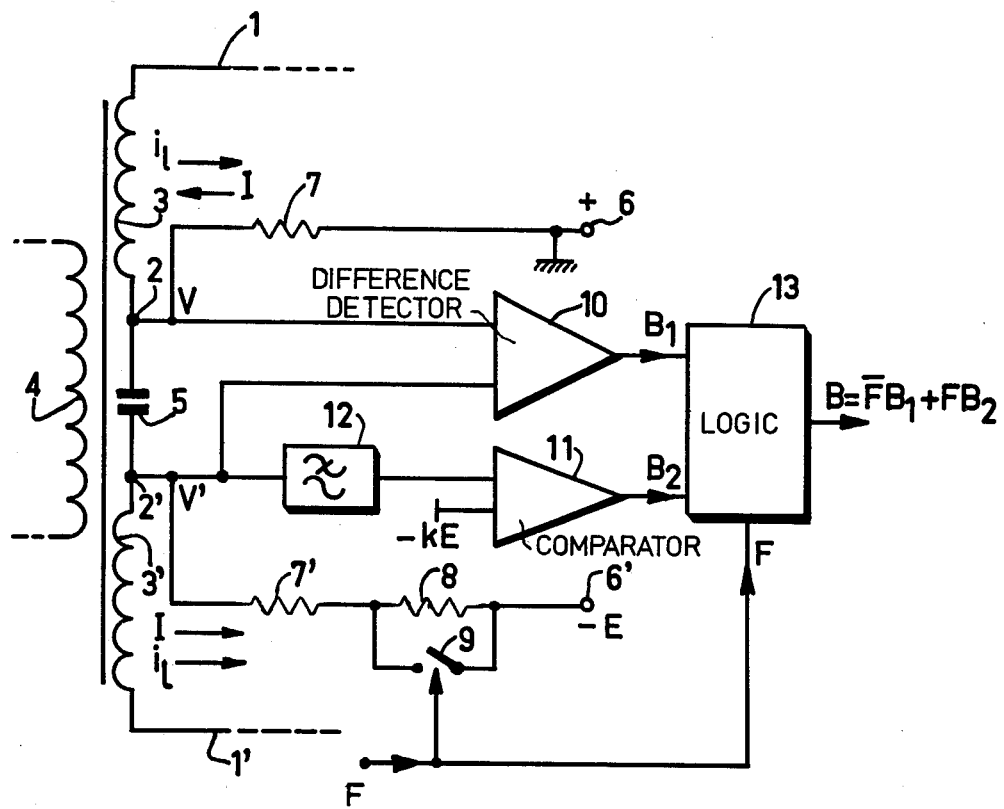

OFF-HOOK DETECTOR WITH REDUCED SENSITIVITY TO COMMON MODE

BACKGROUND OF THE INVENTION

1. Field of the Invention

The invention relates to an off-hook detector for use in a subscriber line interface circuit comprising a transmission bridge in one of whose branches an asymmetry may be introduced or not introduced depending on the value of a control signal, and a difference detector whose inputs are connected to the two terminals of the transmission bridge from where the said branches are connected to the central battery and whose output supplies a logic signal whose states indicate the opening or closing of the loop.

2. Description of the Prior Art

The off-hook detector is an element which detects the establishment or the interruption of the line direct current or transverse current. This transverse current may be disturbed by longitudinal parasitic currents induced on the line by power mains frequencies and which have the same direction at a given instant in the two wires of the line. When they flow through the transmission bridge, each longitudinal current is thus added to the transverse current in one of its branches and is subtracted in the other branch. If the bridge is symmetrical, that is to say if the two branches have the same resistances, the effects of these currents are cancelled and a difference detector connected to the transmission bridge terminals then produces a correct indication of the state of the loop; this detecting mode is of common usage in electronic telephone exchanges. But if an asymmetry is introduced in the bridge, the longitudinal currents cause the appearance at its terminals, superposed on the applied direct current, of an alternating voltage which is equal to the product of the current intensity and the difference of the resistance in the two branches of the bridge. In the event of a bridge which is considerably asymmetrical, the value of this alternating voltage reaches, and even exceeds, the value of the direct voltage at the terminals of the bridge, for example 30 Volts for a value of the central battery voltage equal to 48 Volts, which thus gives rise to inadvertent activation of the difference detector, which may then furnish a faulty indication about the state of the loop. An asymmetry might, for example, be introduced in the transmission bridge when the resistance value in one single branch is increased in order to reduce the power consumption in the line in the case of a "false call", that is to say when a subscriber keeps the handset too long from the hook before dialing or when he forgets to put the handset back on the apparatus at the end of the conversation; it would therefore be sufficient if the central exchange conveys, after a specified time interval, a control signal which causes an electromechanical or electronic interruptor connected to the terminals of a high-value additional resistor in one of the branches of the bridge to close. But the correct detection of the state of the loop by means of the prior art method of differential detection entails the necessity to incorporate in the same manner an additional resistor of the same value in the other bridge, which is a particularly costly solution.

SUMMARY OF THE INVENTION

The invention has for its object to provide an off-hook detector with reduced sensitivity to common mode when an asymmetry is introduced in the transmission bridge, and which thus makes it possible to realize the savings which result from modifying the resistive circuit of one single branch of the bridge, for example in the case of a "false call", while maintaining the difference detection in a symmetrical transmission bridge having a low ohmic value.

According to the invention such a device is characterized in that the said detector comprises a comparator whose first input is connected via a low-pass filter, to the said terminal of the bridge which terminal belongs to the said branch in which an asymmetry may be introduced or not introduced, the second input of the said comparator being connected to a voltage threshold and its output producing a logic signal whose states indicate the openings or closing of the loop, the loop signal in the subscriber line being either the output signal of the difference detector or the output signal of the comparator according as the said control signal puts the transmission bridge in its symmetrical state or in its asymmetrical state.

By means of the following description which is given by way of non-limitative example with reference to the accompanying drawing, it will be better understood how the invention can be put into effect.

BRIEF DESCRIPTION OF THE DRAWING

The sole FIGURE shows the circuit diagram of the off-hook detector in accordance with the invention.

DESCRIPTION OF THE PREFERRED EMBODIMENT

In this FIGURE, the wires 1 and 1' of a subscriber's line lead to the respective terminals 2 and 2' of the transmission bridge via the half-windings 3 and 3' of a transformer whose winding 4 conveys the speech currents to the exchange. The terminals 2 and 2' are interconnected by a capacitor 5 whose value C must be sufficient to effect a quasi short-circuit at the speech frequencies, and are also connected to the positive terminal 6 and to the negative terminal 6' of the central battery each one via a branch of the transmission bridge, the positive terminal 6 being connected to ground and the negative terminal 6' to the potential −E. The branch which is connected between the terminals 2 and 6 and the branch connected between the terminals 2' and 6' comprise the respective identical resistive circuits 7 and 7' having the value $R_1$, and additional resistor 8 having value $R_2$ being arranged in series with the resistive circuit 7' in the branch 2'–6'. An electromechanical or electronic interruptor device 9 controlled by the logic signal F supplied by the central exchange is connected to the terminals of the resistor 8 in order to make the bridge symmetrical or asymmetrical. The well-known off-hook detector formed by a difference detector 10, whose inputs are connected to the terminals 2 and 2' of the bridge, produces at its output a logic signal $B_1$.

For that value of the control signal F which causes the interruptor 9 to close, the bridge is symmetrical and the voltage difference at its terminals is substantially insensitive to common mode effects which cancel each other in its two branches. The states of the output signal $B_1$ of the difference detector 10 correctly indicate opening or closure of the loop. If the value of the control signal F causes the interruptor 9 to open, the resistor 8 is connected into the bridge which then becomes asymmetrical. If the potential at the terminals 2 and 2' of the bridge are designated V and V', respectively, the line direct current is designated I and the longitudinal current having the maximum value $I_l$ induced in the line at an industrial pulse frequency $\omega$ is designated $I_l e^{j\omega t}$ the difference potential between the terminals of the bridge in response to the ohmic drop in its branches is written at the instant t:

$$V - V' = E - (2R_1 + R_2)I - R_2 I_l e^{j\omega t}.$$

It will be noted that the alternating component is important if the value of $R_2$ must be high. But the above expression does not take account of the presence of the capacitor 5 having the value C which, for alternating current, is arranged in parallel with the resistor 8 so that the expression for the difference of the alternating potential at the terminals of the bridge is actually:

$$\frac{R_2}{\sqrt{1 + R_2^2 C^2 \omega^2}} I_l e^{j\omega t}.$$

This expression shows that the asymmetry of the bridge is partially attenuated by the influence of the coupling capacitor of the half-windings of the transformer but to an insufficient extent to render the difference detection by the loop substantially insensitive to common mode. In order to be able to adopt the economical solution of the asymmetrical bridge when, for example, in the case of a "false call" the resistor 8 is introduced in the branch 2'-6', the present invention joins to the difference detector 10 a comparator 11, one input of which is connected to the terminal 2' of the transmission bridge via a low-pass filter 12 and the other input of which is connected to a voltage threshold $-kE$ which is proportional to the battery voltage, the proportionality coefficient k depending on the ohmic drop in the branch 2'-6' of the bridge. The output of a comparator 11 produces the logic signal $B_2$. The logic signals F, $B_1$, $B_2$ are conveyed to a logic device 13 which realizes the logic function $B = \overline{F}B_1 + FB_2$. In this manner, the loop is correctly detected by the output signal of the difference detector when the bridge is symmetrical and by the output signal of the comparator when the bridge becomes asymmetrical; in the first case the detection is substantially insensitive to the influence of common modes because of the symmetry of the bridge and in the second case it is substantially insensitive to this influence thanks to the efficiency of the low-pass filter 12 whose cut-off frequency has a value of a few Hertz.

It should be noted that the difference detector 10 which is active during normal functioning of a subscriber line must have a delay time which is sufficiently small, of the order of some milliseconds, in order to enable detection of loop interruptions owing to dialling. In contrast therewith, the comparator 11, which becomes operative when an abnormal situation occurs which might continue for a certain period of time, for example in the case of a "false call", may allow a low response period.

What is claimed is:

1. An off-hook detector for use in a subscriber line interface circuit to provide a loop signal to indicate the open-loop or closed-loop status of a subscriber line, comprising;

a transmission bridge comprising a first terminal and a second terminal, a first branch connected between said first terminal and one side of a central battery, a second branch connected between said second terminal and the other side of said central battery, said branches normally being symmetrical;

means for introducing an asymmetry in said second branch in response to a control signal;

a difference detector having inputs connected to said two terminals and an output that supplies a first logic signal the state of which indicates the open-loop or closed-loop status of the subscriber line;

a comparator having a first input connected via a low pass filter to said second terminal, a second input connected to a voltage threshold, and an output that produces a second logic signal the state of which indicates the open-loop or closed-loop status of the subscriber line;

a logic circuit connected to said difference detector and said comparator and responsive to said control signal to provide said first logic signal as the loop signal when said branches are symmetrical and to provide said second logic signal as the loop signal when an asymmetry is introduced in response to said control signal.

* * * * *